July 1, 1969 E. C. YACKEL 3,453,111
GRAVURE STRIPPING FILM
Filed June 9, 1966
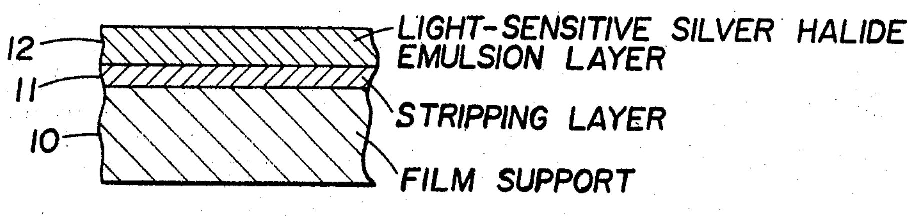
EDWARD C. YACKEL
INVENTOR.
BY *[signature]*
*Henry E Byers*
ATTORNEYS United States Patent Office 3,453,111

Patented July 1, 1969

3,453,111

GRAVURE STRIPPING FILM

Edward C. Yackel, Rochester, N.Y., assignor to Eastman Kodak Company, Rochester, N.Y., a corporation of New Jersey Filed June 9, 1966, Ser. No. 556,325
Int. Cl. G03c *1/90, 1/84;* C09d *3/40*
U.S. Cl. 96—83 9 Claims This invention relates to novel light-sensitive photographic elements, and more particularly to light-sensitive photographic stripping films adapted for preparing improved etching resists for photogravure platemaking purposes, and to processes for making such elements.

In the preparation of etching resists in the photogravure process, it has been proposed to employ light-sensitive elements comprising a film support material for a light-sensitive unhardened gelatin-silver halide emulsion layer attached to the support by means of a variety of subbing layers, antihalation layers, etc., and at least one stripping layer which permits the transfer, after exposure and tanning development, of the image bearing emulsion layer onto the surface of a gravure cylinder. This transfer is customarily accomplished by rolling the dried processed element, emulsion side down, onto the wetted surface of, for example, a copper surfaced gravure cylinder, stripping the support therefrom, washing the cylinder to remove the untanned areas and to eliminate layers which tend to remain on the emulsion layer following the stripping step, and then subjecting the resultant gelatin resist image to an etching operation such, for example, as with ferric chloride as known in the art, whereby the copper surface is differentially etched inversely to the thickness and hardness of the gelatin resist image. While such proposed elements have produced useful etching resists for photogravure operations, they have not proven entirely satisfactory for many commercial applications because of certain serious shortcomings. For example, most of these proposed elements require that in the washing step an organic solvent alone or in admixture with water or a swelling agent be used for the removal of the stripping layer from the photographically prepared gelatin etch resist, whereas the ideal material would permit the removal of the stripping layer by the use of water alone. Also, the multiplicity of and variation in the properties of the layers in many of these proposed elements makes necessary additional washing operations to ensure complete removal of such layers from the gelatin etch resists.

We have now made the important discovery that novel and greatly improved light-sensitive elements (gravure resist stripping films) for preparing etching resists for gravure purposes are obtained by the use of a mixture of a modified shellac and gelatin as a stripping layer, preferably in a 3-layer structure consisting in order of (1) a suitable unsubbed film support, (2) the above stripping layer of the invention, and (3) a conventional self-developing, light-sensitive, hardener-free gelatin-silver halide photographic emulsion layer. The preferred 3-layer elements are outstanding as to reduced cost of production and efficacy for gravure purposes, and are essentially free from any of the above mentioned shortcomings of the previously proposed photogravure elements. For example, when the exposed, processed and dried 3-layer elements of the invention are applied, emulsion side down, onto the wetted surface of a copper gravure cylinder, the film support can easily be stripped off of the stripping layer, and the latter can then be quickly and completely removed from the emulsion layer, together with the untanned gelatin areas, by simply spraying or otherwise applying water (no organic solvent being needed) to the cylinder surface to leave thereon a desirable and sharply defined gelatin etch resist image.

It is, accordingly, an object of the invention to provide a novel and improved light-sensitive element for photogravure processes which contains a stripping layer comprising a compatible mixture of a modified shellac and gelatin. Another object is to provide a 3-layer structure light-sensitive film for photogravure purposes, said layer being in the order of (1) a film support material, (2) a stripping layer comprising a compatible mixture of a modified shellac and gelatin, and (3) a conventional self-developing, light-sensitive hardener-free gelatin-silver halide photographic emulsion layer. Another object is to provide processes for the preparation of the above elements. Other objects will become apparent hereinafter.

In the preparation of the preferred 3-layer light-sensitive elements of the invention, a conventional film support material such as an unsubbed cellulose ester support, e.g. a cellulose acetate support, a cellulose acetate butyrate support, etc., or a polystyrene support, or the like, but preferably an unsubbed cellulose triacetate support, is used as the support layer in thickness substantially on the order of 0.005 to 0.015 inch. Upon this support layer is applied a stripping layer consisting essentially of an aqueous mixture of a modified shellac and gelatin. The dry coverage of this layer can be from 0.5 to 1.0 gram of solids per square foot with a preferred level at about 0.6 to 0.8 gram per square foot. A conventional self-developing, light-sensitive gelatin-silver halide emulsion layer (i.e. an emulsion containing a developer for silver halide) is then applied over the cured stripping layer, the gealtin of this layer being unhardened and without any hardeners therein. A self-developing silver bromoiodide emulsion has been found to be suitable for this purpose. However, various other self-developing silver halide emulsions may also be used, e.g. such as those prepared with silver bromide, silver iodide, silver chlorobromide, etc. The cured emulsion layer can vary in thickness from 0.0005 to 0.001 inch. The film supports are prepared by well known coating techniques and the layers thereon as above indicated, may be applied by conventional methods such as by knife and hopper coating, spraying, brushing, bead coating, and the like.

The composition of the stripping layer in the light-sensitive elements of the invention is critical for effective water-removable thereof in the stripping operation. Common shellac, Laccifer (Tachardia) lacca, has the property of becoming water-soluble when modified by the addition of alkali or amines thus making it compatible with gelatin. However, the common shellac of commerce cannot be used without first subjecting it to a dewaxing treatment. This is conveniently carried out by dissolving the shellac in a suitable solvent such as a lower alkanol, e.g. methanol, ethanol, etc., whereby after a period of stirring and standing, a waxy fraction separates and is removed by filtration. A clear brownish-red solution is obtained which preferably contains from about 15 to 30% by weight of the dewaxed shellac. The solubilizing alkaline agent is then aded to this solution.

Suitable solubilizing agents that can advantageously be used in the practice of the invention are limited to a certain class of water-soluble organic amines including aliphatic amines represented by the following formula:

$$\begin{matrix} R_1 & & \\ & \diagdown & \\ & & N-R \\ & \diagup & \\ R_2 & & \end{matrix}$$

wherein R represents an alkyl group or a hydroxyalkyl group of 1–3 carbon atoms, and $R_1$ and $R_2$ each represents the hydrogen atom, or an alkyl group or hydroxyalkyl group of 1–3 carbon atoms, e.g. methylamine, ethylamine, propylamine, isopropylamine, butylamine, dimethylamine, diethylamine, dibutylamine, trimethylamine, tripropylamine, methanolamine, ethanolamine, propanolamine, isopropanolamine, butanolamine, dimethanolamine, diethanolamine, triethanolamine, tripropanolamine, etc., and cyclic amines such as benzylamine, pyridine, piperidine, and the like. Mixtures of the above amines can also be used. The amount of amine employed has a critical lower limit of about 20% based on dry weight of dewaxed shellac and the amine. Lesser amounts result in coagulation of the shellac when mixed with aqueous gelatin solution. The upper limit is less critical and can vary from about 30 to 50%, but amounts in excess of 50% result in undesirable tackiness of the coated stripping layer. The shellac solution containing the amine in the above range of concentration is then thoroughly mixed with an aqueous 5 to 10% solution of gelatin. The proportion of gelatin to the modified shellac is also important. Too little gelatin results in reticulation during processing and in difficult wash-off; too much gelatin results in difficult stripping. The most useful range is from about 15 to 30% on a dry basis, based on the total weight of shellac and gelatin. The exact chemical constitution of this amine-modified shellac is not known. If desired, an antihalation material such as a conventional antihalation dye, a Carey Lea silver, manganese dioxide and the like, can also be incorporated in the above coating composition. The shellac-gelatin mixture can then be coated onto the unsubbed film support and dried. Thus, the cured stripping layer of the invention is comprised essentially of (1) from 70–85% by weight of the reaction product of 50–80% by weight of dewaxed shellac and 50–20% by weight of an amine as defined hereinabove, and (2) from 30–15% by weight of hardener-free gelatin. The conventional hardener-free, self-developing, light-sensitive gelatin-silver halide emulsion is next applied over the cured stripping layer and the resulting complete element is then cured.

For use, the light-sensitive elements prepared as above are exposed to a siutable subject and then processed with an activator solution for the self-developing emulsion layer followed by stop bath treatment. Suitable activators include aqueous solutions of an alkali metal bromide, e.g. sodium or potassium bromide, with one or more alkali metal carbonates, hydroxides, phosphates, silicates, etc., e.g. sodium or potassium carbonate, sodium or potassium hydroxide, sodium or potassium orthophosphate, sodium or potassium metalsilicate, etc. The activation time is usually about 1–2 minutes. Suitable stop baths include an aqueous sodium or potassium sulfite solution as a prestop bath, and an aqueous solution of sodium chloride or sulfate and acetic acid as a stop bath. The activated element is dipped successively in each of the above stop baths for periods of about 30 seconds to 1 minute. The activator and stop bath temperatures are maintained at 72–76° F. Fixing is not necessary. After washing, the processed element is bathed briefly in a 3% glycerol water solution to prevent severe curling on drying. The dry material is then applied to the copper surface in the usual manner. After about 1 minute, the base is easily stripped away and the stripping layer removed by spraying with water. As water is applied to the layer, swelling occurs which permits solution of the gel between the stencil and the swollen stripping layer, the swollen layer separates and is washed away.

The following example will serve further to illustrate the invention.

Example

A stripping layer coating composition was prepared as follows:

Solution A.—100 g. of a 20% by weight solution of dewaxed shellac in methanol was thoroughly mixed with 7 g. of triethanolamine.

Solution B.—44 g. of a 10% aqueous gelatin solution and 62 g. of water were melted together at 40° C.

Solution A was gradually added to Solution B while Solution B was being stirred. The mixture was then coated on an unsubbed cellulose acetate film support at a coverage of 5 grams per square foot. After drying a hardener-free gelatino-silver halide photographic emulsion containing a dihydroxy benzene tanning developing agent was coated over the stripping layer at the rate of 270 mg./sq. ft. silver and 1160 mg./sq. ft. gelatin and cured.

The light-sensitive photographic element thus prepared was exposed to a subject and processed as follows:

(1) Activated for approximately 1 minute in a solution having the formulation:

| | | |
|---|---|---|
| Sodium carbonate (monohydrated) | g. | 75 |
| Sodium hydroxide (fused) | g. | 5 |
| Potassium bromide | g. | 2 |
| Water to make 1 liter. | | |

(2) Prestopped by dipping for 30 seconds in 5% aqueous sodium sulfite solution.

(3) Stopped by dipping for 30 seconds in an aqueous solution containing 5% of sodium chloride and 3% of acetic acid.

The processed element was then washed with tap water below 68° F. for a period of 5 minutes, dried, applied to a smooth copper surface wetted with water, and the film support carefully stripped therefrom. The stripping layer and the non-exposed untanned gelatin areas were easily removed by spraying with water at 100° F. A well defined etch resist image remained on the copper surface. After a conventional etching operation with ferric chloride, a relief image was obtained which was well adapted for use in photogravure printing.

If desired, a backing layer or layers can be coated on the reverse side of the support, e.g. a gelatin layer for non-curling purposes, but preferably the light-sensitive elements of the invention are limited to 3-layer structures for economy and simplicity of preparation and use in photogravure processes.

As previously mentioned, an antihalation dye, a Carey Lea silver dispersion or some other antihalation material can be incorporated in the stripping layer composition of the above example. Also other photographic film supports can be used in place of the cellulose triacetate, if desired. It will be understood further that any other of the mentioned amines such as dibutylamine, triethylamine, diethanolamine, trimethanolamine, tripropanolamine, etc., can be used to solubilize the dewaxed shellac, and that the proportions of the so modified amine-shellac and gelatin in the stripping layer compositions can be varied within the specified limits to give similarly good etch resists on substitution in the procedure of the above example.

Referring to the accompanying drawing of a typical light-sensitive element of the invention, FIG. 1 is a cross-sectional view showing a film support 10 having a stripping layer 11 of the invention coated thereon, and a hardener-free self-developing light-sensitive gelatin-silver halide emulsion layer 12 coated over layer 11.

The invention has been described in considerable detail with particular reference to certain preferred embodiments thereof, but it will be understood that variations and modifications can be effected within the spirit and scope of the invention as described hereinabove and as defined in the appended claims.

I claim:

1. A light-sensitive photographic element comprising an unsubbed film support having on one side thereon a stripping layer comprising (1) from 70–85% by weight of the reaction product of 50–80% by weight of dewaxed shellac and 50–20% by weight of an organic amine selected from the class consisting of an amine having the following formula:

wherein R represents a member selected from the group consisting of an alkyl group of from 1–3 carbon atoms and a hydroxyalkyl group containing from 1–3 carbon atoms, and $R_1$ and $R_2$ each represents a member selected from the group consisting of the hydrogen atom, an alkyl group of from 1–3 carbon atoms and a hydroxyalkyl group containing from 1–3 carbon atoms, benzylamine, pyridine and piperidine, and (2) from 30–15% by weight of gelatin, and having a hardener-free, self-developing, light-sensitive silver halide photographic emulsion layer directly over said stripping layer.

2. A light-sensitive photographic element of claim 1 wherein said stripping layer includes a conventional photographic antihalation material.

3. A light-sensitive photographic element of claim 1 wherein said organic amine is triethanolamine.

4. A light-sensitive photographic element of claim 1 wherein said organic amine is diethanolamine.

5. A light-sensitive photographic element of claim 1 wherein said organic amine is triethylamine.

6. A light-sensitive photographic element of claim 1 wherein said film support is unsubbed cellulose triacetate, wherein said organic amine is triethanolamine, and wherein said emulsion layer contains a dihydroxybenzene.

7. A photographic stripping layer composition comprising an aqueous dispersion of (1) from 70–85% by weight of the reaction product of 50–80% by weight of dewaxed shellac and 50–20% by weight of an organic amine selected from the class consisting of an amine having the following formula:

wherein R represents a member selected from the group consisting of an alkyl group of from 1–3 carbon atoms and a hydroxyalkyl group containing from 1–3 carbon atoms, and $R_1$ and $R_2$ each represents a member selected from the group consisting of the hydrogen atom, an alkyl group of from 1–3 carbon atoms and a hydroxyalkyl group containing from 1–3 carbons atoms, benzylamine, pyridine and piperidine, and (2) from 30–15% by weight of gelatin.

8. A photographic stripping layer composition of claim 7 wherein said amine is triethanolamine.

9. A photographic stripping layer composition of claim 7 containing a conventional photographic antihalation material.

References Cited

UNITED STATES PATENTS

| | | | |
|---|---|---|---|
| 2,207,388 | 7/1940 | Von Kujawa | 96—83 |
| 2,427,481 | 9/1947 | Weible et al. | 106—133 |

NORMAN G. TORCHIN, *Primary Examiner.*

R. H. SMITH, *Assistant Examiner.*

U.S. Cl. X.R.

96—84; 106—133